United States Patent [19]

Thoolen

[11] Patent Number: 5,713,246
[45] Date of Patent: Feb. 3, 1998

[54] METHOD FOR FIXING AN ENERGY-STORING FLYWHEEL WITH PRETENSION ON A SUPPORT AND UNIT COMPRISING AN ENERGY STORING FLYWHEEL

[75] Inventor: Franciscus J.M. Thoolen, Horn, Netherlands

[73] Assignee: CCM Beheer B.V., Nuenen, Netherlands

[21] Appl. No.: 397,140

[22] PCT Filed: Sep. 3, 1993

[86] PCT No.: PCT/NL93/00180
§ 371 Date: Mar. 10, 1995
§ 102(e) Date: Mar. 10, 1995

[87] PCT Pub. No.: WO94/07053
PCT Pub. Date: Mar. 31, 1994

[30] Foreign Application Priority Data

Sep. 11, 1992 [NL] Netherlands ............... 9201584

[51] Int. Cl.⁶ ................ G05G 1/00; F16B 2/14
[52] U.S. Cl. ............... 74/572; 403/367; 403/273
[58] Field of Search ................ 74/572; 403/367, 403/368, 273

[56] References Cited

U.S. PATENT DOCUMENTS 4,266,442  5/1981  Zorzi .................. 74/572
4,569,114  2/1986  Ashcombe et al. ........... 74/572 X

FOREIGN PATENT DOCUMENTS

| 0137759 | 4/1985 | European Pat. Off. |
| 0145182 | 6/1985 | European Pat. Off. |
| 0479736 | 4/1992 | European Pat. Off. |
| 2578926 | 9/1986 | France. |
| 2 004 659 | 8/1971 | Germany ............... 403/368 |
| 1 270 449 | 11/1986 | U.S.S.R. ............... 74/572 |

Primary Examiner—Rodney H. Bonck
Assistant Examiner—Mary Ann Battista
Attorney, Agent, or Firm—Edmund M. Jaskiewicz

[57] ABSTRACT

Method for applying an energy-storing flywheel (2) with pre-tension with an inner bore on a coaxial support (16) rotating symmetrically with the latter and having a tapering outer surface, in which a ring (22a, 22b, 22c, 22d) is placed in the flywheel bore with a tapering inner surface, of which the taper corresponds with that of the support (16) and the entire unit thus obtained is shifted on the support (16) until the desired pre-tension is obtained. In accordance with the invention both the inner bore of the flywheel (18a, 18b, 18c, 18d) and the outer surface of the ring (22a, 22b, 22c, 22d), which co-operate, have a design with a corresponding taper. Furthermore, The invention includes a clamping ring (22a), which can be used when using this method, having a tapering inner surface, the outer surface, intended for functioning with the flywheel being also conical.

5 Claims, 2 Drawing Sheets

METHOD FOR FIXING AN ENERGY-STORING FLYWHEEL WITH PRETENSION ON A SUPPORT AND UNIT COMPRISING AN ENERGY STORING FLYWHEEL

FIELD OF THE INVENTION

The invention concerns a method for fixing a composite energy-storing flywheel with pre-tension with an inner bore on a coaxial support rotating symmetrically with the latter and having a tapering outer surface, in which a ring is placed in the flywheel bore, said ring having a tapering inner surface, of which the taper corresponds with that of the support and the entire unit thus obtained is shifted on the support until the desired pre-tension is obtained.

DESCRIPTION OF THE PRIOR ART

A similar method is known from EP-B1- 0 137 759. The ring used in this known method has a cylindrical outer surface, fitting within the cylindrical bore of the flywheel, and is provided with a number of incisions running over the greatest part over its length. A consequence thereof is that the ring is elastically deformable in a radial direction due to changes in the widths of the incisions, with which it is intended to accomplish, that by placing the ring with the tapered inner bore on the tapered rotating symmetrical support, the outer surface in contact with the inner bore of the flywheel deflects outwards, thereby generating radial compressive stress in the flywheel.

The objection to this known method is that the presence of the longitudinal incisions, as a result of changes in their width, results in surface damage to the flywheel bore, and therefore in stress concentrations that could have fatal results at a high rotational speed, while the radial pre-tension attainable with this known method is still insufficient to avoid delamination of the flywheel when operating at extremely high rotational or peripheral velocities respectively in the order of 500–600 m/s.

SUMMARY OF THE INVENTION

The aim of this invention is to overcome this objection. In accordance with the invention this aim is achieved by designing both the inner bore of the flywheel and the co-operating outer surface of the ring, with a corresponding taper.

These measures result in an uninterrupted outer surface of the ring, so that the chance of damage to the inner bore of the flywheel is nil. Furthermore, a considerably higher pre-tension can be achieved, which means that higher flywheel rotational velocities are possible.

BRIEF DESCRIPTION OF THE DRAWINGS

The invention is described in connection with the drawing in which:

FIG. 3 explains the use of this clamping ring in combination with the flywheel part in a drawing which is not to scale.

DESCRIPTION OF THE PREFERRED EMBODIMENTS

Figure 1:
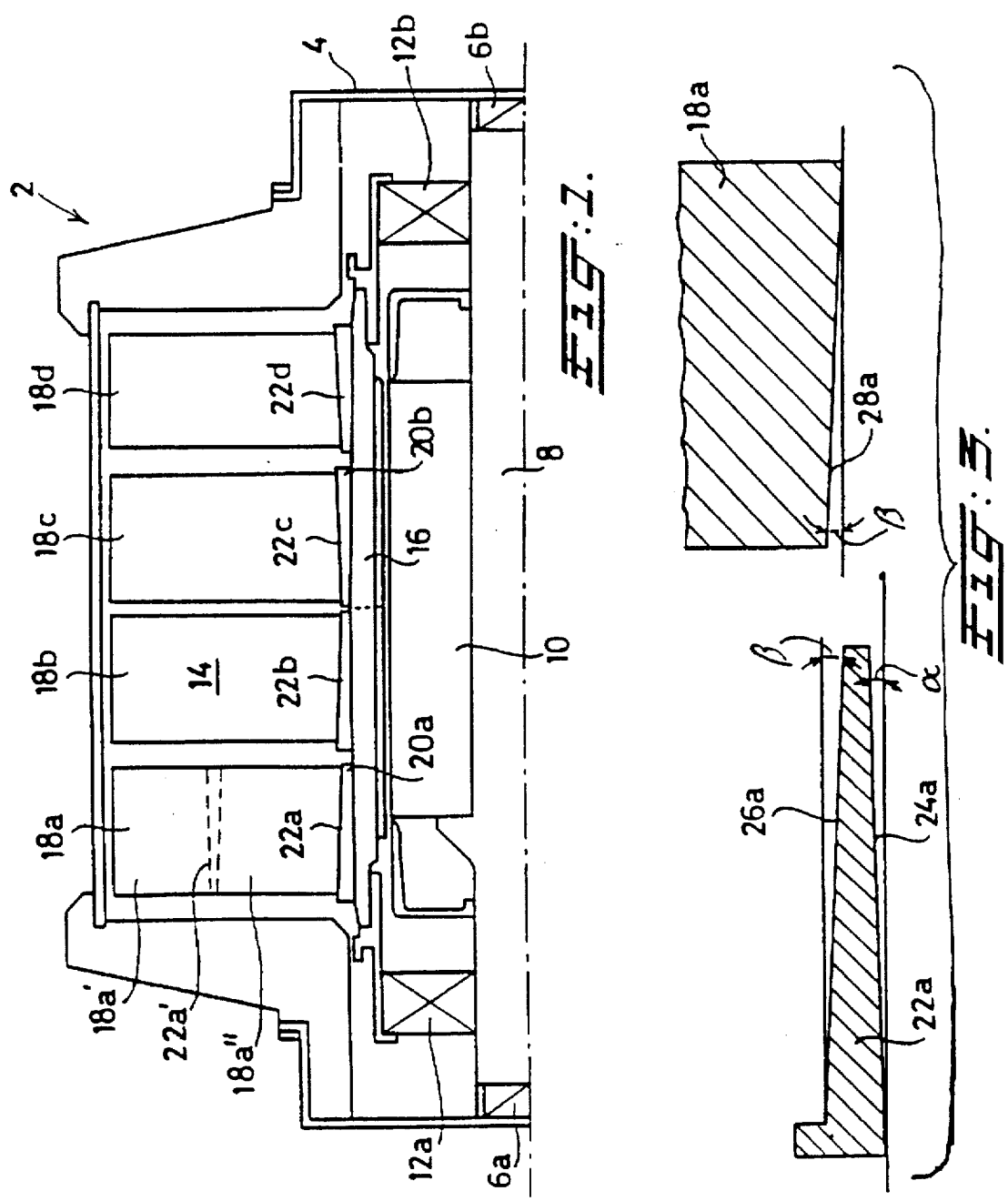
FIG. 1 is a longitudinal section through a flywheel energy storage unit, in which the flywheel parts have been fixed according to the method of the invention.

FIG. 1 schematically shows a flywheel energy storage unit in its entirety indicated by reference numeral 2, containing a housing 4, with in it a stator 8 with stator windings 10, supported by suitable supports 6a and 6b. By means of suitable bearings 12a and 12b stator 8 bears a rotor 14, which consists of a rotor bush 16 and the disc-shaped flywheel parts 18a–18d, which are fixed on the rotor bush. Each of these flywheel discs has a wound and therefore stratified structure, as for example known from EP-A- 0 137 759.

Figure 2:
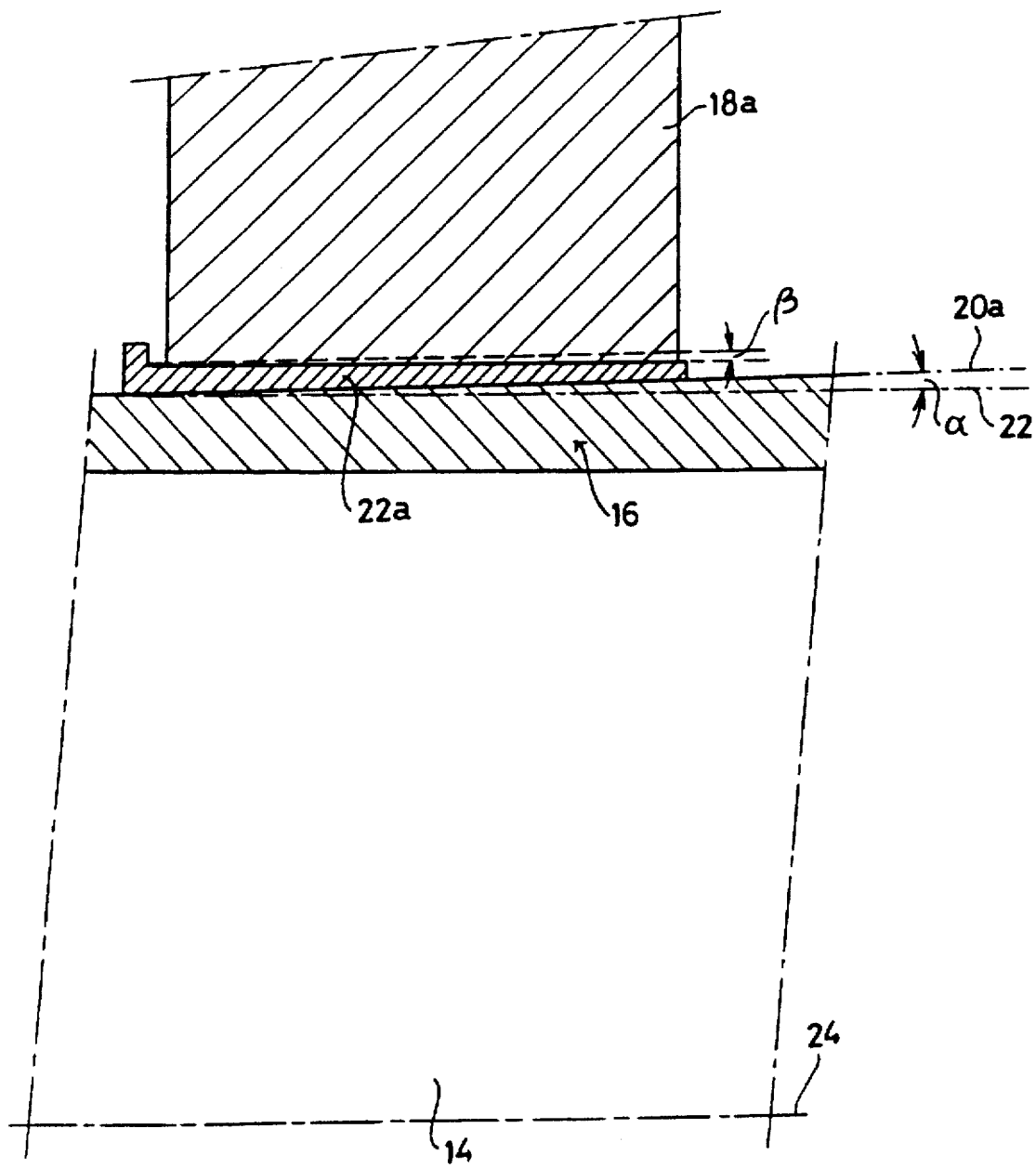
FIG. 2 is a partial section on an enlarged scale of an energy-storing flywheel part, in combination with the used clamping ring in accordance with the invention.

During operation radially outward forces will occur in the respective flywheel parts, as a result of which delamination will occur when a certain limit value of the number of revolutions is exceeded. This limit value is increased by applying radial compression stresses via the conically clamped joints. In accordance with the invention these compression stresses are generated and the rotational velocity limit value is considerably increased by using a specially formed clamping ring in combination with a special configuration of the inner surface of each rotor part 18a–18d and the outer surface of rotor bush 16. As FIG. 2 in particular shows, the outer surface 20 of the preferably steel rotor bush is tapered, in such a way that this surface 20 encloses with line 22, which is parallel to the rotor bush centre line 24, an angle $\alpha$, in such a way that the diameter of the outer surface part 20a of rotor bush 16 increases from left to right up to half of the length of the rotor bush, after which the diameter decreases again with the same degree of taper. Now in accordance with the invention clamping rings 22a–22d are used between the respective flywheel parts 18a–18d and the outer surface of rotor bush 16 which have a corresponding taper with inner surface 24a, which co-operates with the outer surface of rotor bush 16. In FIG. 3 this taper has been drawn in an exaggerated way, and it is also indicated by angle $\alpha$.

In accordance with the invention the outer surface 26a of clamping ring 22a (preferably made of aluminium) also has an increasing conical design, indicated in FIG. 3 by angle $\beta$. This taper is also present at inner surface 28a of flywheel part 18a. There the angle between this inner surface and a line parallel to the flywheel centre line is also equal to $\beta$. For the sake of clarity these angles, which in practice are approx. 0.8° degrees if there is a proved suitable degree of taper of approx. 1:80, have been drawn larger in an exaggerated way in FIG. 3.

For the assembly of flywheel parts 18a–18d on rotor bush 16, a ring, for example ring 22a, is first pressed on the matching flywheel part, for example flywheel part 18a, after which the flywheel part is pressed on the rotor together with the ring. In this way the correct radial pretension is obtained if the dimensioning is correct.

Since, as FIG. 1 shows, the outer surface of rotor bush 16 consists of two parts, 20a and 20b, with a mutually opposed taper, rotor parts 18b and 18a are applied to the left on the rotor with their clamping rings 22b and 22a, while rotor parts 18c and 18d are applied to the right of the rotor with clamping rings 22c and 22d.

It is within the scope of the invention when the clamping rings are not only applied between a flywheel part and the rotor bush, but also between two radially connected sections of a flywheel part designed with a suitable configuration, as indicated in FIG. 1 for flywheel parts 18a' and 18a", with clamping ring 22a', which is marked by broken lines and situated in between. It is also possible to combine the use of a clamping ring in accordance with the invention with the usual thermal contraction. Finally, the clamping ring can be used for fixing balancing weights.

The wear of the ring on the axle can be prevented by coating the axle with a thin coating of ceramic material (not indicated in the figures) preceding the application of the ring.

I claim:

1. Method for pretensioning an energy-storing flywheel (18a–18d) having a tapering inner bore and mounting the flywheel on a coaxial support (16) having a tapering outer surface and rotating symmetrically with the flywheel comprising the steps of: placing a ring (22a–22d) having an uninterrupted outer tapering surface (26a) into engagement with the tapering flywheel bore, said ring having a tapering inner surface (24a), the tapering inner surface of the ring corresponding to and engaging the tapering outer surface of the coaxial support, shifting of the ring within the flywheel bore on the support until the desired pre-tension is obtained, forming each of the inner bore of the flywheel and the outer surface (26a) of the ring with a corresponding taper which fit closely with each other.

2. A unit comprising an energy-storing flywheel (18a–18d) having a tapered inner bore, a coaxial support (16) rotating symmetrically with the flywheel (18a–18d) and having a tapering outer surface (20a), and a prefabricated clamping ring (22a–22d) having a tapering inner surface corresponding to and engaging the tapering outer surface (20a) of the support (16), the clamping ring (22a–22d) having an uninterrupted outer tapering surface (26a) in engagement with the inner bore of the flywheel (18a–18d), the clamping ring (22a–22d) tapering outer surface (26a) has an increasing conical taper corresponding to a similarly decreasing conical taper of the inner bore of the flywheel (18a–18d).

3. A unit according to claim 2 wherein the taper of the outer surface of the ring lies between 1:60 and 1:100.

4. A unit according to claim 2 wherein the inner (24a) and outer (26a) surfaces of the clamping ring (22a–22d) are tapered in the same direction.

5. A unit according to claim 4 wherein the taper of the inner (24a) and outer (26a) surfaces of the clamping ring is the same.

* * * * *